United States Patent [19]

Ogilvie et al.

[11] Patent Number: 4,758,707
[45] Date of Patent: Jul. 19, 1988

[54] PULSED ARC WELDING

[75] Inventors: Graeme J. Ogilvie, Romsey; William K. Brougham, Novar Gardens; Gary L. Cheesman, Coromandel Valley; David M. Leske, Park Holme, all of Australia

[73] Assignees: Welding Industries of Australia Pty., Ltd., Thomastown; Commonwealth Scientific and Industrial Research Organization, Campbell, both of Australia

[21] Appl. No.: 58,361

[22] Filed: Jun. 4, 1987

[30] Foreign Application Priority Data

Jun. 4, 1986 [AU] Australia ............................... PH6249

[51] Int. Cl.[4] ............................................. B23K 9/09
[52] U.S. Cl. ............................ 219/130.51; 219/130.31
[58] Field of Search ................... 219/130.51, 137 PS, 219/130.31

[56] References Cited

U.S. PATENT DOCUMENTS

| | | | |
|---|---|---|---|
| 4,409,465 | 10/1983 | Yamamoto et al. | 219/130.51 |
| 4,438,317 | 3/1984 | Ueguri et al. | 219/130.51 |
| 4,459,460 | 7/1984 | Ogilvie et al. | 219/130.51 |
| 4,620,082 | 10/1986 | Graville et al. | 219/130.51 |

*Primary Examiner*—Clifford C. Shaw
*Attorney, Agent, or Firm*—Cushman, Darby & Cushman

[57] ABSTRACT

A pulsed arc welding system includes a current pulse generating circuit and a background current generating circuit. The lowest arc voltage across the arc load is detected during a predetermined time period immediately preceeding the onset of each current pulse. The pulse repetition rate is controlled on the basis of this detected voltage so that the detected arc voltage becomes constant.

5 Claims, 13 Drawing Sheets

PULSED ARC WELDING

FIELD OF THE INVENTION

This invention relates to improvements in pulsed arc GMA welding.

BACKGROUND OF THE INVENTION

Pulsed arc welding was first proposed in the early 1960's and since that time has become one of the most useful developments in arc welding. However, pulsed arc welding has never reached its full potential due mainly to the number and complexity of the controls which an operator must manipulate in order to achieve satisfactory welding conditions, in particular, the most desirable welding condition whereby one welding metal droplet is detached with each welding current pulse irrespective of the wire feed rate.

The variables which exist in a pulsed arc welding system include:
(a) pulse height—the amplitude of the current pulse,
(b) pulse width—the duration of the current pulse,
(c) wire feed rate—the lineal speed at which the electrode is fed to the welding arc,
(d) pulse frequency—the repetition rate of the current pulses,
(e) background current—the relatively low value of DC current which flows in the arc in the periods between current pulses,
(f) the arc current, and
(g) the arc voltage.

The pulse height in combination with the pulse width define the energy content of the pulse and this must always be sufficient to form and detach the weld metal droplet. The pulse height must be above "the threshold" current level in a particular wire size/type/shielding gas combination necessary to achieve spray transfer of the weld metal. It is desirable for a practical welding system to include a feedback mechanism of some type to take account of changes in the welding parameters, such as variations in mains voltage and wire feed rate due to changes in the motor speed or slippage in the wire feed system. Although various forms of feedback system have been proposed, none have had the desired effect of maintaining welding parameters which ensure the detachment of a single droplet for each current pulse generated by the system. This is principally due to the fact that the circuitry does not adequately adapt to the changes in welding conditions caused by changes in the wire feed rate and changes in the position of the electrode relative to the workpiece (arc length). Most attempts to compensate for such changes have concentrated on controlling the pulse width to maintain a relatively constant electrode burn-off rate. However, such an approach ignores the importance of the correct relationship between the pulse frequency and the wire feed rate resulting in the production of more than one metal droplet per current pulse, or in the need for more than one pulse for the detachment of the metal droplet, which in turn results in spatter of the weld metal and other undesirable effects.

Various attempts have been made to overcome the above described problems, and while some have met with substantial success, a number of important shortcomings still remain. For example, U.S. Pat. Nos. 4,409,465 Yamamoto et al and 4,438,217 Ueguri et al discloses essentially the same approach to the control of arc current pulses in which the voltage across the arc is monitored and a feedback circuit is used to maintain the arc voltage at a predetermined desired average level. As indicated in the above patents, the voltage across the arc may be measured in one of the following ways:
(1) as measured during the pulse period only,
(2) as an average of the pulse and background arc voltage, or
(3) as measured in the background period only.

In the first measurement method listed above, since the measurement is taken at the time of maximum current, any practical voltage measurement is likely to include significant voltage drop components due to:
(a) the voltage drop across the electrode wire extension,
(b) the voltage drop across the contact tip/electrode wire interface, and/or
(c) the voltage drop across the connecting leads between the welding power source and the welding arc.

Such voltage drops cannot readily be compensated for, especially where the electrode wire extension changes according to operator technique.

Where the arc voltage is measured in accordance with item (2) above, since there is a ratio of approximately 2:1 between the pulse and background voltage levels, especially at low wire-feed rates where the pulse/background duty cycle is low, an excessive averaging time must be applied to the arc voltage signal. This of course adds undesirable lag in the control system. Where the wire-feed rate is high, the pulse/background duty cycle is correspondingly high and the effects detailed for voltage measurement during the pulse period only necessarily prevail.

Where the arc voltage is measured during the background period only, the voltage drop problems detailed above are less significant since background current levels are typically much lower than pulse current levels. However, if the arc voltage level during the background period is averaged, the accuracy of the result can be compromised by the occurrence of short circuiting within the arc. This typically occurs immediately following a pulse period, and especially where the machine has been set to produce a short arc length. It will be appreciated that when the arc length is short, a bridge of molten electrode metal may still be intact between the electrode wire and the detaching droplet at the instant at which the droplet contacts the workpiece or molten weld pool. This short circuiting naturally affects the average arc voltage and results in inaccuracy in the control applied to the arc welding system.

The above described problems are especially apparent for high resistivity electrodes, such as Inconel, and it is one object of the present invention to provide a pulse arc welding system which at least reduces the above problems and improves control over the welding process.

SUMMARY OF THE INVENTION

In accordance with the invention, there is provided a pulsed arc welding system comprising a current pulse generating circuit and a background current generating circuit including a DC power supply circuit adapted for connection to a load via an electrode wire, switch means for causing current pulses generated by said current pulse generating circuit to be applied to the load, means for detecting the voltage applied by said circuits across said load, and means for controlling said switch means to control the pulse repetition rate to maintain a substantially constant predetermined arc voltage across the load, characterized in that said means for detecting said arc voltage includes means for determining the lowest arc voltage which occurs in a predetermined time period immediately preceding the onset of each current pulse.

It will be appreciated that the arc length, and therefore the arc voltage, is constantly changing as the droplets of molten electrode material are formed and detached from the electrode wire and as a result the actual arc voltage is a complex combination of changing voltage values. By selecting the arc voltage at its lowest possible level and using this voltage to determine the pulse repetition rate, the influence on the arc voltage by the features referred to above is kept to a minimum and the errors due to short circuiting are avoided.

The means by which the arc voltage is monitored is not important to the invention and any one of the many known means, for example as disclosed in the United States patents referred to above, or as detailed further below, may be used with acceptable results. Similarly, the means by which the minimum arc voltage is detected prior to the onset of each current pulse is not important and numerous alternatives may be developed by a competent electrical engineer.

In one presently preferred arrangement, described in greater detail below, a sample and hold type circuit is connected to sample the arc voltage during a time "window" period immediately preceding the onset of each welding current pulse, and the circuit is arranged to hold the lowest voltage seen during the sampling period and to output that voltage as a control parameter to the circuitry controlling the welding system. The length of the time "window" is not particularly important but a time of approximately 1000 us has been found to be satisfactory. The lowest voltage seen during the sampling period may be held by a minimum voltage finding circuit which may operate as a negative peak rectifier.

The means by which the lowest arc voltage level is used to control pulse repetition rate may also take any suitable form, for example as described in the above numbered United States patent or as described in greater detail below.

Where the wire feed rate is set at a high level, the current pulses may be so close together that the period of background current level is minimal. In these circumstances, the current pulse controlling circuitry will operate on the basis of a combination of the average arc voltage and the lowest arc voltage occurring immediately before the onset of each current pulse. Where the system is unable to detect a minimum background voltage, the controlling circuitry will operate on the basis of the average arc voltage alone.

While in the following description the switch means will be seen to switch on the secondary side of the DC power supply circuit, it should be appreciated that the invention is equally applicable to switching arrangements which are applied to the primary side of the DC power supply circuit.

BRIEF DESCRIPTION OF THE DRAWINGS

One presently preferred embodiment of the invention will now be described with reference to the accompanying drawings in which:

FIGS. 4 and 4A-4I are detailed circuit diagrams showing the control circuitry aspects of the block diagram of FIG. 1.

DESCRIPTION OF THE PREFERRED EMBODIMENT

Figure 1:
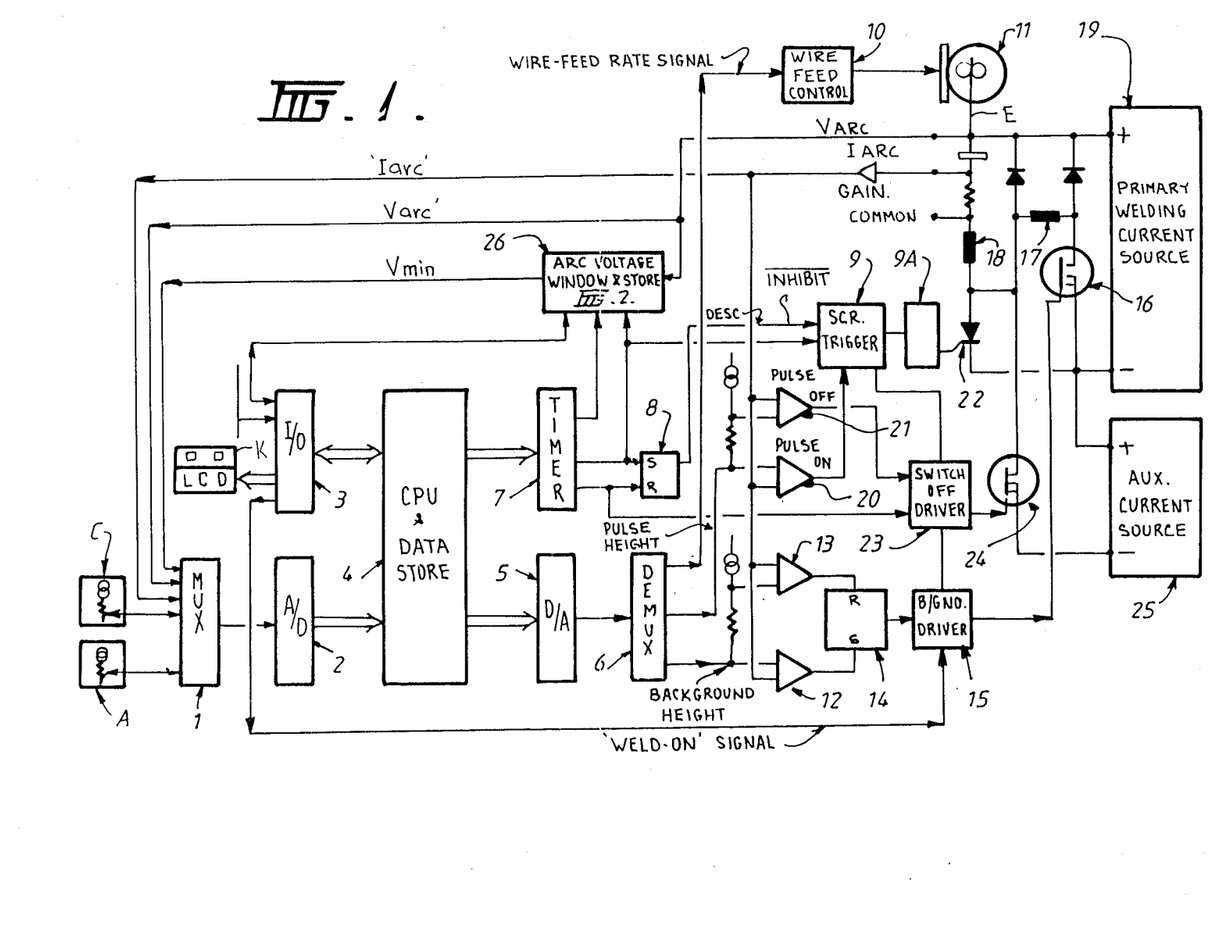
FIG. 1 is a schematic block diagram of a control circuit embodying the present invention.

Referring firstly to FIG. 1 of the drawings, the control circuitry embodying the present invention will be seen to include a multi-channel analog to digital converter comprising an analog multiplexer 1 and analog to digital convertor 2 to which several analog input signals are applied. The input signals include:

a zero to 10 volt analog signal derived from a current control circuit C set by the operator to adjust the desired average welding current level of the system;

a zero to 10 volt analog signal set by arc length control circuit A set by the operator to adjust the length of the arc;

voltage signals "V arc" and "V min" representing the actual arc voltage, or more specifically, selected parts of the arc voltage, and a voltage signal "I arc" representing the actual arc current.

Figure 4:
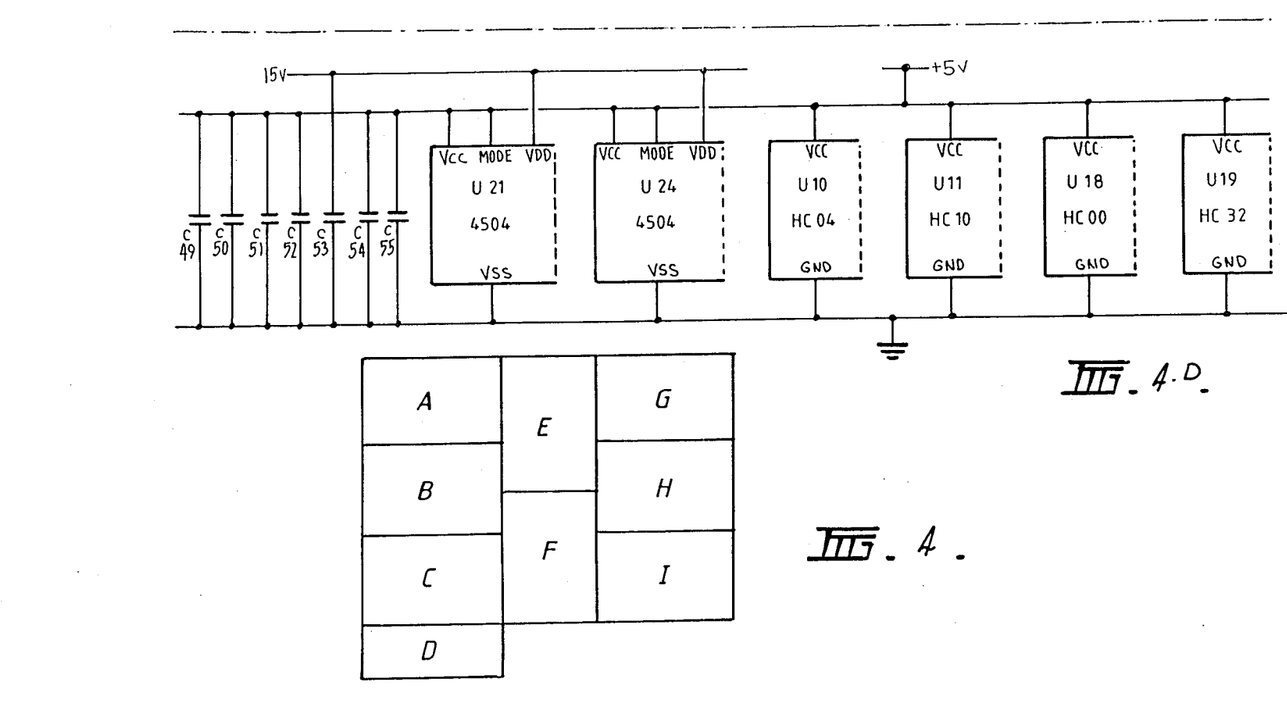
Figure 4G:
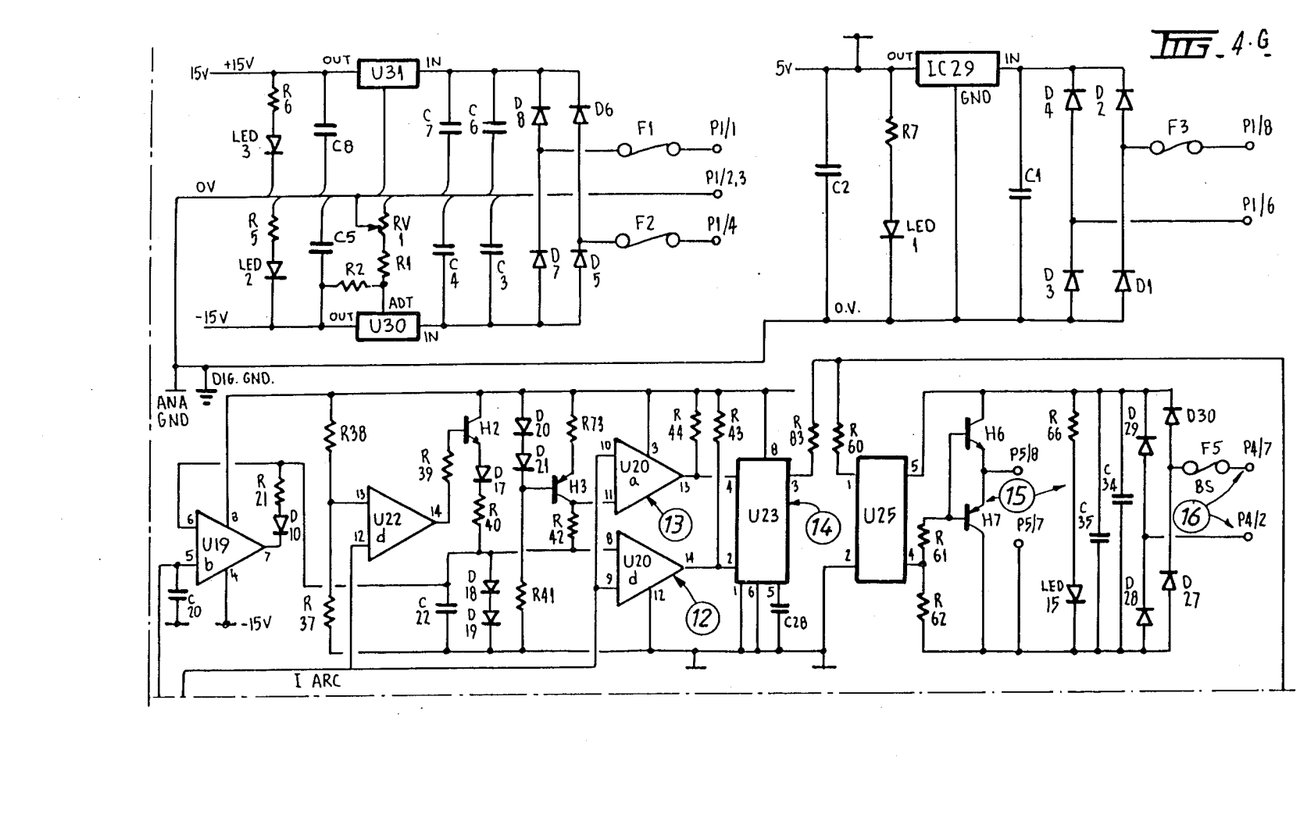
Figure 4I:
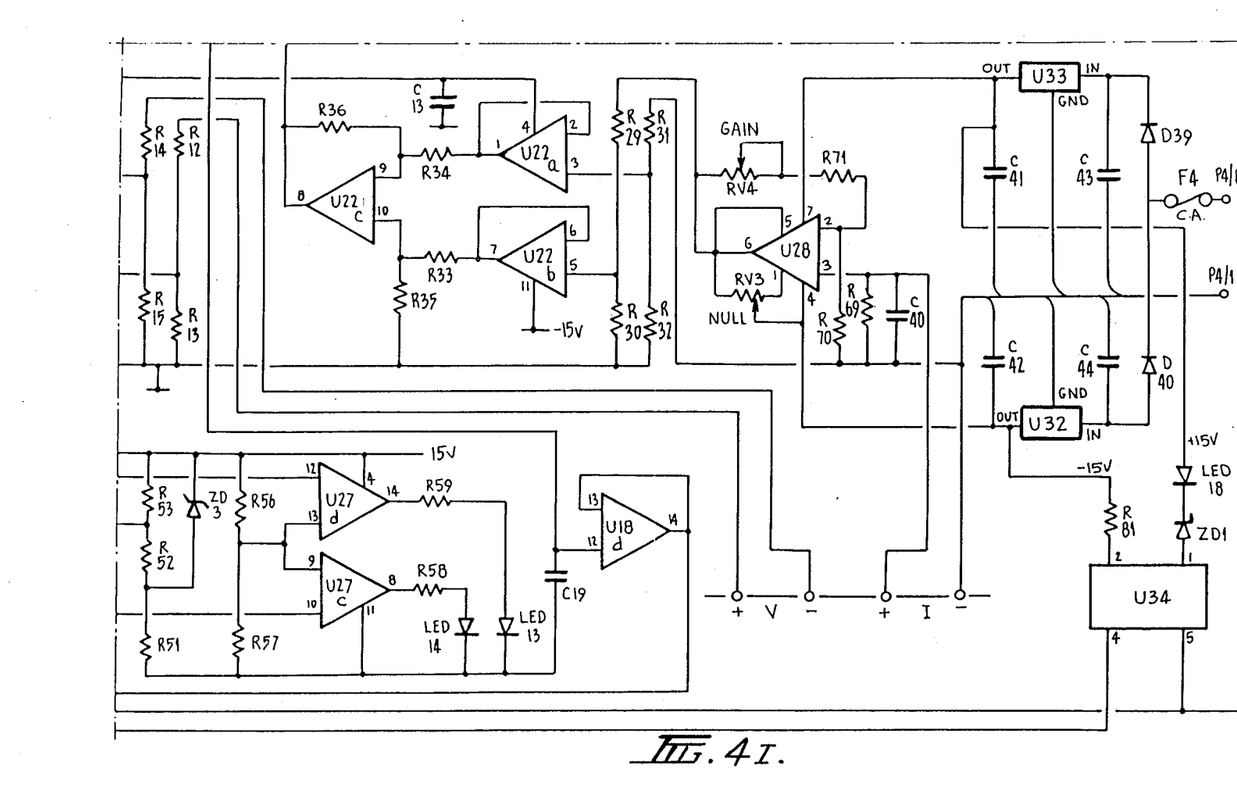

Two digital input/output devices 3 (FIG. 4) provide a total of forty four available parallel I/O lines. These lines connect to:

1. A liquid crystal alpha-numeric display LCD.
2. A simple keyboard K comprising two keys labelled "change" (P2/2) and "accept" (P2/3) which are used with the display D for the purpose of selecting welding schedule parameters.
3. Inputs from:
   a. Welding gun switch—(P2/4)
   b. Gas purge switch—(P2/5)
   c. Wire inch switch—(P2/6)
4. A separate circuit to control the functions:
   a. Shielding gas flow—(P6/4)
   b. Wire-feed off/on—(P6/5)
5. Analog multiplexer and demultiplexer channel selects—(PD/0-7).
6. The arc voltage minimum detector circuit—(input PD/7, output PE/6).
7. Diagnostic outputs "Arc Active" (P6/6) and "Processed Arc Active" (P6/7).

The outputs from the analog to digital converter 2 and from the input/output device 3 are connected to a central processing unit and data store 4 which comprises an eight bit microprocessor (type 8085), a 2K RAM data storage and an 8K EPROM software storage (FIG. 4).

The microprocessor 4 outputs the parameters "wire feed rate", "pulse height" and "background height" in digital form on the basis of software stored in the EPROM. These signals are converted to analog form by a digital to analog converter 5 and are de-multiplexed by a de-multiplexer 6. The microprocessor 4 also outputs digital information to a timer device 7 which in turn outputs three separate digital pulses which define the start and finish of the sampling window and the start and finish of the welding current pulse, and thereby the pulse width and pulse frequency. Two of the output pulses are used to control the arc voltage sampling window circuit 26. One of these outputs and the other output are connected to a set-reset flip-flop 8 which toggles when the outputs go low, thus inhibiting the SCR trigger circuit 9 so that background current only will flow in the welding arc between welding current pulses.

The analog parameter "background height" as outputed by the de-multiplexer 6 is connected to one input of a comparator 12. A further comparator 13 has one input connected to the "background height" parameter line from microprocessor 4 to which has been added a fixed voltage which represents a background window. The second input of each comparator 12 and 13 is connected to the voltage signal "I arc" representing the actual arc current. The comparators 12 and 13 are so arranged that when the arc comparators 12 and 13 are so arranged that when the arc current falls below the lower level of the background window, the output of the set-reset flip flop 14 is toggled high resulting in a background driver circuit 15 turning on the background current switch circuit 16. In the present embodiment, a parallel connected bank of MOSFET transistors (FIG. 4). When the actual arc current exceeds the upper level of the background window, the output from the set-reset flip flop 14 is toggled low resulting in the background driver circuit 15 turning off the background current switch circuit 16. The rise and fall times of the background current is limited by the impedance of series connected inductors 17 and 18, and by the welding arc.

The necessary power is derived from a three phase transformer/rectifier circuit 19 having any suitable form, and including capacitive filtering, which provides both the arc current, including the background supply, and the current pulses. As mentioned above, although in the present circuitry the controlled switching of the current pulses is applied to the secondary side of the transformer/rectifier circuit 19, it will be understood that the necessary switching may be applied to the primary side of the transformer/rectifier circuit with equally acceptable results.

The "pulse height" parameter output from the de-multiplexer 6 is connected to one input of a comparator 20 while a second comparator 21 has one input connected to the "pulse height" parameter from microprocessor 4 to which has been added a fixed voltage which represents a pulse height window. The second input of each comparator 20 and 21 is connected to the voltage "I arc" representing the actual arc current and the comparators are so arranged that when the actual arc current falls below the lower level of the pulse window, comparator 20 supplies a signal to the SCR trigger circuit 9 which in turn triggers an SCR pull-up/pull-down driver 9A, which in turn triggers the main SCR switching circuit 22 into its conducting state, assuming that the SCR trigger 9 is not inhibited and that the "weld on" signal is active. In this regard, the SCR trigger circuit 9, the background driver circuit 15 and a switch-off driver circuit 23 are each inhibited when the "weld on" signal is in the off state.

A pulse current now flows from the power supply 19 through the arc, through the inductor 18 and through the SCR switch circuit 22. When the actual arc current rises above the upper level of the pulse window, comparator 21 supplies a signal to the switch-off driver circuit 23, which in turn triggers the switch-off MOSFET transistor circuit 24 into its conducting state for a predetermined time period. This period is such that the SCR switching circuit 22 is held reverse biased for a period greater than its turn-off time, typically of the order of 50 us. In this way, the SCR switching circuit 22 commutates to the off or non-conducting state. An auxilliary current source 25 supplies a voltage to reverse bias the SCR switching circuit 22.

Also connected to the SCR trigger circuit 9 is the output from the timer 7 which the sets the time period of each current pulse. Thus, a start signal is relayed form the timer 7 to the trigger circuit 9 to start a welding current pulse. A further output from the timer 7 is connected to the switch-off driving circuit 23 to terminate the welding current pulse after the predetermined pulse period has elapsed.

The welding arc voltage signal "V arc" applied to the multiplexer 1 is proportion to the instantaneous voltage access the welding arc. The voltage signal "V min" is proportional to the lowest welding arc voltage detected by a sample and hold type circuit 26 which is arranged to sample the arc voltage during a window time period immediately preceding each welding current pulse (FIG. 3) and to hold the lowest voltage seen during the sampling period and to output that voltage as a steady state voltage level to the multiplexer 1 to control the arc pulse repetition rate to maintain the detected voltage at a predetermined set level, as will be described in greater detail below.

Figure 2:
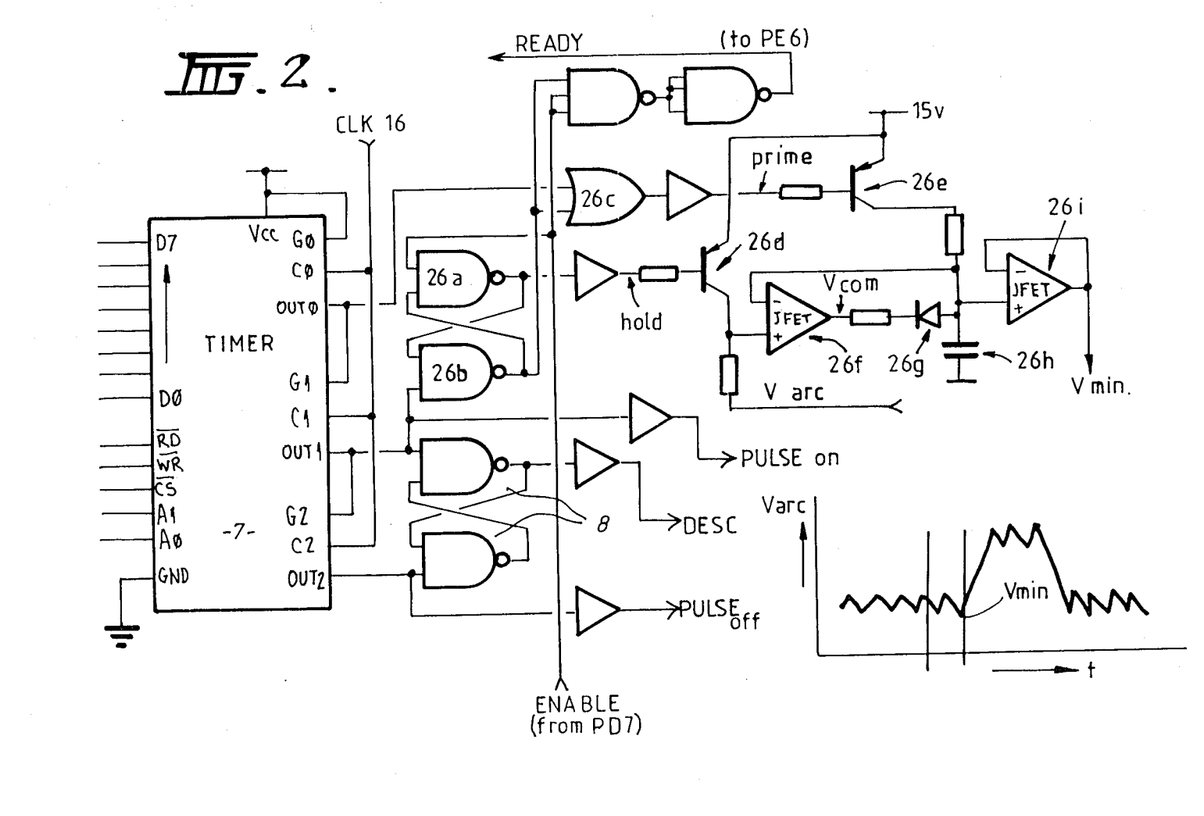
FIG. 2 is a more detailed circuit diagram of the arc voltage minimum detector.
Figure 3:
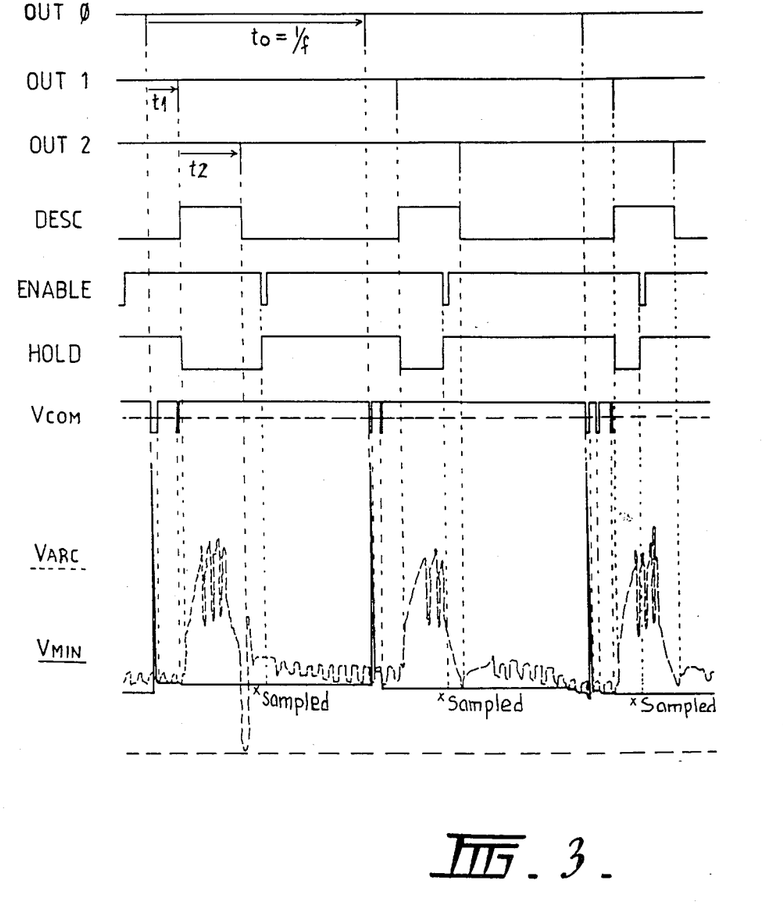
FIG. 3 is an explanatory timing diagram associated with the arc voltage minimum detector circuit.

Referring now to FIGS. 2 and 3 of the drawings, the presently preferred form of the arc voltage minimum detector circuit 26 is shown in greater detail. The microprocessor 4 initiates a sampling operation during the latter part of the pulse timing period referred to above by pulsing low the "enable" line via the input/output circuit 3, which clears the set-reset flip-flop consisting of gates 26A and 26B and thus lowers the blocking input to the OR gate 26C. When the first timer signal "out0" pulses low the OR gate 26C lowers the "prime" signal briefly, turning on transistor 26E and thus charging storage capacitor 26H to the positive supply voltage. The "out0" signal also triggers the second timer with the sampling window time, which is of the order of 1000 us (FIG. 3). Since the sampling window is located in the latter part of the "background" current period, short circuits are avoided since these occur immediately after the termination of the pulse period. This is apparent from the arc voltage trace in FIG. 3.

The instantaneous arc voltage input "Varc" is compared to the voltage on the capacitor 26H by the op-amp 26F. When "Varc" is lower, the capacitor 26H is discharged through the diode 26O. When "Varc" is higher, the diode 26O isolates the capacitor. In this way the capacitor stores the minimum level "Varc" since the beginning of the window.

At the end of the window period the second timer signal "out1" pulses low, triggering the start of the welding current pulse and setting the flip-flop of gates 26A and 26B. The "hold" output from gate 26A goes low, turning on transistor 26D which forces high the positive input to the op-amp 26F and thus also forcing high the output of the op-amp "Vcom", which is prevented by diode 26G from discharging the capacitor 26H. The voltage so held on the capacitor is buffered by the JFET op-amp 26I for output as the arc voltage minimum signal "Vmin". The "ready" output is then raised to indicate to the microprocessor 4 that the signal "Vmin" to the multiplexer 1 is valid. The microprocessor reads the level of "Vmin" by means of the multiplexer 1 and the analog-to-digital converter 2, then operates the "enable" line to begin the next cycle.

The control circuitry shown schmetically in FIG. 1 of the drawings is illustrated in greater detail in FIGS. 4 of the drawings in which the circuitry previously indicated only in block form is shown in detail. Since much of the circuitry shown in FIG. 4 is standard in nature, detailed description of the circuitry beyond the above general description will not be provided for each and every section of the circuit. The operation of the circuit will be well understood from the above description when taken in conjunction with the following additional description. In particular, the wire feed motor control circuit 10 will not be described further since it is not central to the present invention. Further details of circuitry suitable for the primary welding current source 19 and the auxilliary current source 25 may be found in the specification of PCT/AU80/0008 (publication No. WO81/01323), the contents of which are incorporated herein by cross reference.

The power supplies 19 and 25 are connected to the arc electrode E, supported by a standard arc gun (not shown), to which arc electrode wire E is fed by the wire feed motor 11 under the control of a gun switch (not shown) to create a welding arc between the electrode E and a workpiece W. As described above, the arc current is controlled by a pulse switching circuit incorporating the main current switch SCR 22 controlled by the triggering circuit 9, 9A and the main drive switching circuit 24.

Welding current is detected as the voltage drop across a shunt 27 which is then processed by a shunt amplifier or "gain" circuit which is shown in detail in FIG. 4 of the drawings. The "gain" circuit amplifies the voltage drop across the shunt 27 by a factor of 160, divides the signal by 10, buffers the signal by means of amplifiers U22a and U22b and then multiplies the signal by 10. This process electrically isolates the current signal, has low noise characteristics and remains accurate even at the low background current levels which the circuit must monitor.

Many of the operations of the above described circuitry are controlled by software stored in the EPROM 4 (FIG. 4). To assist in further understanding of the present embodiment, a typical operation will now be briefly described with reference to the explanatory diagram of FIG. 5.

Figure 5:
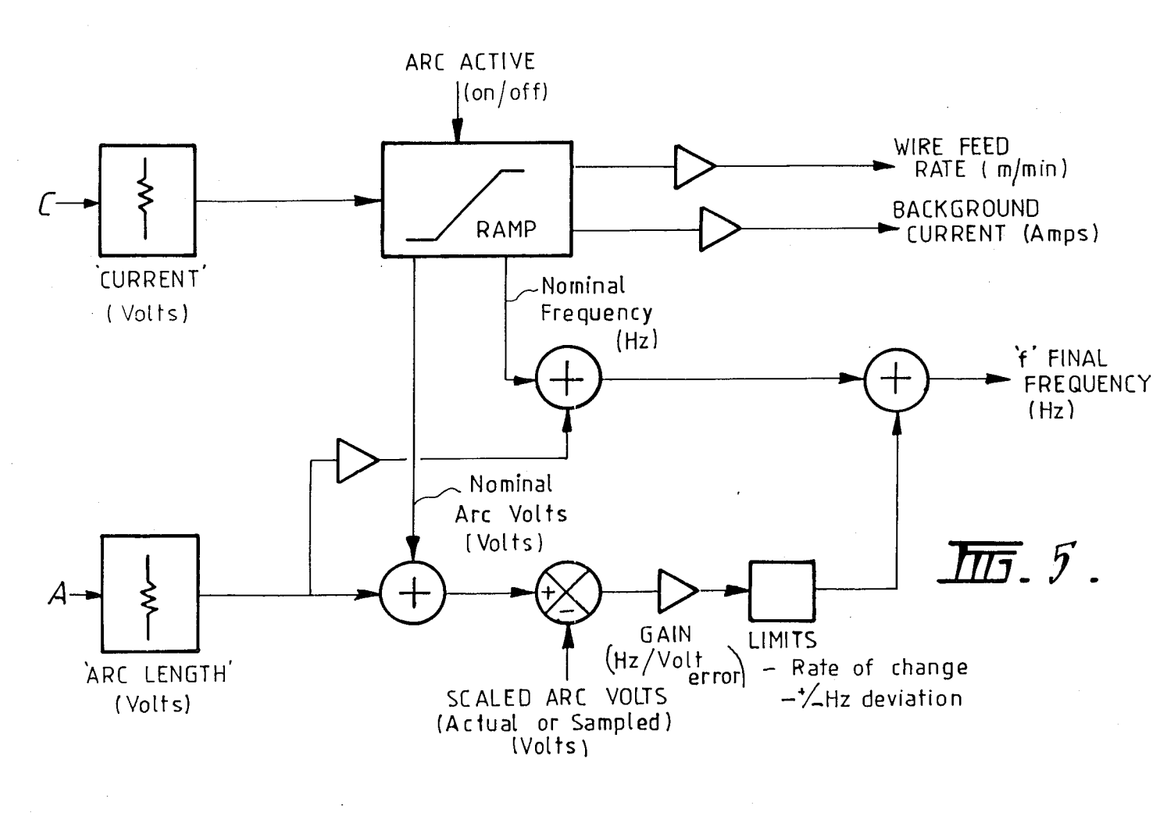
FIG. 5 is an explanatory sketch relating to the changes in the pulse frequency rate.

The machine is initially in an "idle" state. When the gun switch is pressed this is detected by the microprocessor 4 which then begins an arc initiation sequence. Shielding gas flow is enabled by the processor via i/o port 3, then wire feed and welding current pulses are commenced. The pulse frequency is initially high, to facilitate the striking of an arc.

Software contained in the EPROM 4 checks for arc current and arc voltage, which when present together, are taken to indicate a valid arc condition, and a software parameter "arc active" is set logical "on". Following arc initiation, "arc active" initiates in software, the commencement of a "ramp up" procedure through which the parameters of wire feed rate, background current, nominal arc volts and nominal pulse frequency are increased from their respective minimum programmed values, up to their respective operating values as determined by the setting of the "current" potentiometer circuit C in conjunction with the selected weld schedule. When the gun switch is released a similar "ramp down" of the parameters is performed. Wire feed is stopped to allow burn-back of the wire, then welding current pulses are disabled and after a short delay, shielding gas flow is disabled.

Up to 100 weld schedules are held as a library in the EPROM software. Each programme is a unique combination of the previously mentioned parameters pulse width, pulse height, minimum wire feed rate, maximum wire feed rate, minimum background current, maximum background current, minimum (nominal) arc voltage, maximum (nominal) arc voltage, minimum (nominal) pulse frequency, maximum (nominal) pulse frequency. Each programme has been previously developed to suit a particular electrode wire size/type/shielding gas combination.

The desired weld schedule is selected by means of the ACCEPT and CHANGE keys by means of which the operate chooses one weld schedule from a sub-set of 12 which have previously been selected from the internal library. A software driven alpha-numeric display is provided which allows the operator to step through a menu of weld schedules and other applicable options.

The arc voltage "Vmin", as sampled by sample and hold circuit 26 described above, is a DC level equal to the lowest arc voltage which occurs within the sampling window which precedes each current pulse. This voltage, which may be used in mathematical combination with the average arc voltage "Varc", is compared in software to a desired arc voltage (as determined by the operator "current" control in conjunction with the selected weld schedule) and an arc voltage correction factor, as determined by the setting of the operator "arc length" control. The result of this comparison is a frequency correction factor which, in the instance of the actual arc voltage being greater than the desired arc voltage acts to decrease the pulse frequency, hence decrease the electrode wire burn-off rate tending to reduce the actual arc voltage, and vice versa (see explanatory diagram of FIG. 5A).

The final pulse frequency is determined as the result of the summation of the nominal pulse frequency (as determined by the setting of the operator "current" control in conjunction with the selected weld programme) with the frequency correction factor as described above, and with a secondary frequency correction factor as a direct function of the setting of the operator "arc length" control. In the instance of this control being set to reduce the arc length, then its effect will be to reduce the pulse frequency and vice versa. Software limits the rate of change of the pulse frequency, and also sets a maximum allowable deviation from the nominal pulse frequency. These limits determine the response of the system to changes in operating arc length as typically occur with a change of gun position relative to the workpiece.

To initiate each welding current pulse at the final pulse frequency, pin 10 of U6 goes low which in turn triggers SCR trigger circuit 9, the output of which on pin 3 goes high for a short, pre-determined period. This output in turn triggers the output of pull-up pull-down SCR trigger 9A to go high, triggering the main SCR 22 into a conducting state. At the same time, pin 6 of the flip flop 8 goes high placing trigger circuit 9 in the not-inhibited condition.

The width of the welding current pulse is as set by the selected weld programme, and remains fixed for all operating conditions of that programme. To end a welding current pulse at the desired pulse width, pin 13 of timer 7 goes low which in turn triggers the main switch-off driver 23 (U21), the output of which on pin 3 goes high for a short, predetermined period. This output in turn, via an optical isolator U26 causes H8 of driver 23 to be biased on and H9 to be biased off. These two components constitute a pull-up pull-down driver for the transistor circuit 24 which causes the main SCR 22 to be commutated into a non-conducting state.

The height of the welding current pulse is as set by the selected weld programme, and remains fixed for all operating conditions of that programme. A DC voltage level corresponding to the minimum pulse height window is output from pin 12 of U10 this voltage is applied to pin 5 of comparator 20, the other input pin 4 of which is connected to a voltage representing the actual arc current. The comparator is so arranged that when the actual arc current falls below the minimum pulse height window, then its output pin 2 goes low initiating an SCR trigger pulse as described above, provided that trigger 9 is not in the inhibited condition.

To the minimum pulse height as present on pin 5 of comparator 20 is added a constant DC voltage as dropped across R24 by means of a constant current supplied from H1 and associated components R20, R22, R23, D11. Hence a DC level corresponding to the maximum of the pulse height window is applied to pin 7 of comparator 21 the other input pin 6 of which is connected to the abovementioned voltage representing the actual arc current. The comparator 21 is so arranged that when the actual arc current exceeds the maximum pulse height window output pin 1 goes low so triggering U21 of switch-off driver 23 and causing the SCR 22 to be commutated into the non-conducting state as described above.

The background current is determined by the setting of the operator "current" control in conjunction with the selected weld programme. A DC voltage level is output on pin 14 of de-multiplexer 6 which corresponds to the minimum background current window, and is connected to pin 5 of U19b associated with comparators 12 and 13. During each welding current pulse, as detected by comparator U22d associated with comparators 12 and 13, capacitor C22 is charged to a voltage equal to the forward voltage drop across D18 and D19. After each welding current pulse, C22 is discharged via U19b which acts as a sink only buffer to a level equivalent to the minimum background current window, the rate of discharge being a function of C22/R21. In this way the background current is elevated after each welding current pulse preventing the arc being extinguished at the point at which the background current must take over from the pulse current. The voltage across C22 is connected to one input of comparator 12. To this level is added a constant DC voltage as dropped across R42 by means of a constant current supplied from H3 and associated components R73, R41, D20, D21. Hence a DC level corresponding to the maximum background current window is connected to pin 11 of comparator 13. Both comparators 12 and 13 have their other inputs connected to the voltage representing actual arc current. The comparators 12, 13 are so arranged that when the actual arc current falls below the minimum background window level, flip flop 14 is triggered on, the output of which on pin 3 goes high. This signal is directed via optical isolator U25 and transistors H6 and H7 of driver circuit 15 such that H6 is biased on and H7 is biased off causing the transistor circuit 16 to conduct. Similarly, when the actual arc current rises above the maximum background window level, circuit 16 becomes non-conducting.

The wire feed rate is determined by the setting of the operator "current" control in conjunction with the selected weld programme. A DC voltage level representing wire feed rate is output on pin 15 of de-multiplexer 6 is buffered by U18d, the output of which is connected to a separate controller for the wire feed motor, which maintains a wire feed speech proportional to the input voltage.

To begin welding the operator closes the gun switch G which is usually integral with the welding handpiece. This is read by the microprocessor, which then causes:
(1) gas valve to operate to supply shielding gas to the weld zone,
(2) enabling of the three drivers 9, 15 and 23 allowing trigger pulses to be output to the SCR 22, and pulses off transistors and background current switch respectively as required,
(3) enabling of the wire feed motor drive causing electrode wire to be fed into the arc zone.

The entire contents of the provisional specifications lodged with Australian Patent Applications of which this is the complete specification are hereby imported into this specification and form part of the disclosure of this specification. The claims form part of the disclosure of this specification.

We claim:
1. A pulsed arc welding system, comprising:
a current pulse generating circuit for generating a current pulse; and
a background current generating circuit, including:
a DC power supply circuit adapted for connection to a load via an electrode wire,
switch means for switching current pulses generated by said current pulse generating circuit to the load,
means for detecting a lowest arc voltage across said load which occurs in a predetermined time period immediately preceding the onset of each current pulse, and
means connected to said switch means and said arc voltage detecting means, for controlling said switch means to control a pulse repetition rate such that said detected arc voltage across the load becomes constant.

2. The arc welding system of claim 1, wherein said means for determining said lowest arc voltage comprises a sample and hold circuit connected to sample said arc voltage, circuit means for causing operation of said sample and hold circuit during a time period immediately preceding the onset of each current pulse, said sample and hold circuit being adapted to hold the lowest voltage sampled during said time period.

3. The arc welding system of claim 2, wherein said current pulse generating circuit includes means for setting the current pulse frequency and for setting the time period of each current pulse, said circuit means for causing operation of said sample and hold circuit including timing means for activating said sample and hold circuit during said time period immediately preceding each current pulse.

4. The arc welding system of claim 2, wherein said sample and hold circuit includes a minimum voltage finding circuit operating as a negative peak rectifier to hold the lowest voltage sampled during said time period.

5. The arc welding system of claim 1, wherein said arc voltage detection means is also connected to averaging means to generate an average arc voltage signal, said means for controlling said pulse repetition rate including means for using said average arc voltage signal in combination with a signal representing said lowest arc voltage to control said pulse repetition rate.

* * * * *